Patent …

2,870,166

6-EPOXYALKYL ETHERS OF ALIPHATIC TETRA-HYDROPYRAN-2-CARBOXYLATES

Donald G. Kubler, South Charleston, W. Va., assignor to Union Carbide Corporation, a corporation of New York No Drawing. Application October 23, 1957
Serial No. 691,796

3 Claims. (Cl. 260—345.8)

This invention is directed to a new class of epoxyalkyl ethers of tetrahydropyran carboxylates and has for an object the provision of a novel class of 6-epoxyalkyl ethers of aliphatic tetrahydropyran-2-carboxylates characterized by the general formula:

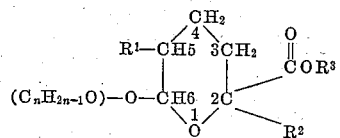

wherein $R^1$ and $R^2$ each represent members selected from the group consisting of hydrogen or lower alkyl radicals; $R^3$ represents an aliphatic hydrocarbon group containing from 1 to 20 carbon atoms and the group $(C_nH_{2n-1}O)$ represents an epoxyalkyl group composed of carbon, hydrogen and one oxygen atom attached to vicinal carbon atoms containing $n$ carbon atoms, $2n-1$ hydrogen atoms, wherein $n$ represents a whole positive integer in the range of from 3 through 8.

The novel compounds of this invention have been found to possess utility as plasticizers and/or stabilizers for various synthetic resins and particularly for polyvinyl chloride resins and vinyl resins containing a major proportion of copolymerized vinyl chloride. Compounds of the invention are also useful for the production of polymeric compositions since, in the case of the olefinically unsaturated esters defined by the aforementioned general formula, the compounds possess two dissimilar polymer-forming groups, namely, an alpha-epoxy group,

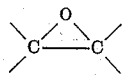

and an olefinic group, $>C=C<$. As may be observed, the monomeric compounds can be subjected to polymerization conditions whereby polymerization occurs through said olefinic group to the substantial exclusion of polymerization through said epoxide group. This type of polymerization has been characterized in the art as vinyl polymerization and usually produces a substantially linear polymer. Polymerization conditions can then be altered to provide conditions favoring coupling or cross-linking through the epoxide group to produce a hard, infusible, insoluble resin possessing many desirable properties and characteristics. In addition, the dissimilarity of polymer-forming groups enables control over polymer formation in such a manner as to produce a variety of polymers having a diversity of useful properties not heretofore available. The compounds of the invention are produced by the reaction of the corresponding olefinically unsaturated starting material which contains olefinic unsaturation in the ether moiety and a peracid, preferably peracetic acid, at a temperature in the range of from 0° C. to about 100° C. at atmospheric pressure.

In carrying out the process of this invention for preparing the 6-epoxyalkyl ethers of aliphatic tetrahydropyran-2-carboxylates, a typical 6-alkenyl ether of aliphatic tetrahydropyran-2-carboxylate, such as tridecyl 6-allyloxytetrahydropyran-2-carboxylate, is dissolved in ethylbenzene in a reaction vessel equipped with a column and a still head. The mixture is heated and the temperature maintained in the range of from 0° C. to 100° C. and preferably at about 70° C. Thereupon, peracetic acid is added to the mixture in the form of a solution of peracetic acid and a suitable solvent such as, for example, ethyl acetate. After the addition of the peracetic acid solution is complete, temperature conditions are maintained for a period of time until an analysis for peracetic acid indicates that substantially the theoretical amount of peracetic acid has been consumed. Thereupon, the reaction mixture is removed from the reaction vessel and fed to a still kettle containing ethylbenzene as a pot boiler under reflux and all the low-boiling constituents are removed. The residue material, tridecyl 6-(2,3-epoxypropoxy)tetrahydropyran-2-carboxylate, can then be accepted as a residue product, if desired, or subjected to distillation for further refinement. The amount of peracid normally employed is not necessarily critical. It is preferred, however, to carry out the process of this invention by charging an excess of olefin to the reaction.

Typical compounds suitable for use in providing the novel compounds of this invention include:

Ethyl 6-allyloxytetrahydropyran-2-carboxylate;
Butyl 6-allyloxytetrahydropyran-2-carboxylate;
n-Octyl 6-allyloxytetrahydropyran-2-carboxylate;
2-ethylhexyl 6-allyloxytetrahydropyran-2-carboxylate;
Hexadecyl 6-allyloxytetrahydropyran-2-carboxylate;
Allyl 6-allyloxytetrahydropyran-2-carboxylate;
Crotyl 6-allyloxytetrahydropyran-2-carboxylate;
Decyl 6-allyloxytetrahydropyran-2-carboxylate;
Tridecyl 6-allyloxytetrahydropyran-2-carboxylate;
Ethyl 6-methallyloxytetrahydropyran-2-carboxylate;
Butyl 6-methallyloxytetrahydropyran-2-carboxylate;
n-Octyl 6-methallyloxytetrahydropyran-2-carboxylate;
2-ethylhexyl 6-methallyloxytetrahydropyran-2-carboxylate;
Hexadecyl 6-methallyloxytetrahydropyran-2-carboxylate;
Allyl 6-methallyloxytetrahydropyran-2-carboxylate;
Crotyl 6-methallyloxytetrahydropyran-2-carboxylate;
Decyl 6-methallyloxytetrahydropyran-2-carboxylate;
Tridecyl 6-methallyloxytetrahydropyran-2-carboxylate;
Ethyl 6-crotyloxytetrahydropyran-2-carboxylate;
Butyl 6-crotyloxytetrahydropyran-2-carboxylate;
n-Octyl 6-crotyloxytetrahydropyran-2-carboxylate;
2-ethylhexyl 6-crotyloxytetrahydropyran-2-carboxylate;
Hexadecyl 6-crotyloxytetrahydropyran-2-carboxylate;
Allyl 6-crotyloxytetrahydropyran-2-carboxylate;
Crotyl 6-crotyloxytetrahydropyran-2-carboxylate;
Decyl 6-crotyloxytetrahydropyran-2-carboxylate;
Tridecyl 6-crotyloxytetrahydropyran-2-carboxylate;
Ethyl 6-(2-pentenyloxy)tetrahydropyran-2-carboxylate;
Butyl 6-(2-pentenyloxy)tetrahydropyran-2-carboxylate;
n-Octyl 6-(2-pentenyloxy)tetrahydropyran-2-carboxylate;
2-ethylhexyl 6-(2-pentenyloxy)tetrahydropyran-2-carboxylate;
Hexadecyl 6-(2-pentenyloxy)tetrahydropyran-2-carboxylate;
Allyl 6-(2-pentenyloxy)tetrahydropyran-2-carboxylate;
Crotyl 6-(2-pentenyloxy)tetrahydropyran-2-carboxylate;
Decyl 6-(2-pentenyloxy)tetrahydropyran-2-carboxylate;
Tridecyl 6-(2-pentenyloxy)tetrahydropyran-2-carboxylate;

The aforementioned starting materials are prepared by the reaction of a lactone of a 6-hydroxytetrapyran-2-carboxylic acid with a molar excess of an aliphatic alcohol in the presence of an acidic catalyst at temperatures sufficiently high enough to provide for constant removal of the water formed during the reaction. Preferably, such a reaction is conducted in the presence of a water-entraining agent. The aforesaid lactones and alcohols are usually reacted in molar ratios of from 1 to 2 to around 1 to 10 or more. The processes for preparing the aforementioned starting materials are more fully described and claimed in copending application Serial No. 665,118, filed June 12, 1957.

In the procedure described above for the reaction of the aforementioned starting materials with a peracid, a variety of 6-epoxyalkyl ethers of aliphatic tetrahydropyran-2-carboxylates are readily prepared and include:

Ethyl 6-(2,3-epoxypropyloxy)tetrahydropyran-2-carboxylate;
Butyl 6-(2,3-epoxypropyloxy)tetrahydropyran-2-carboxylate;
n-Octyl 6-(2,3-epoxypropyloxy)tetrahydropyran-2-carboxylate;
2-ethylhexyl 6-(2,3-epoxypropyloxy)tetrahydropyran-2-carboxylate;
Hexadecyl 6-(2,3-epoxypropyloxy)tetrahydropyran-2-carboxylate;
Allyl 6-(2,3-epoxypropyloxy)tetrahydropyran-2-carboxylate;
Crotyl 6-(2,3-epoxypropyloxy)tetrahydropyran-2-carboxylate;
Decyl 6-(2,3-epoxypropyloxy)tetrahydropyran-2-carboxylate;
Tridecyl 6-(2,3-epoxypropyloxy)tetrahydropyran-2-carboxylate;
Ethyl 6-(2,3-epoxy-2-methylpropyloxy)tetrahydropyran-2-carboxylate;
Butyl 6-(2,3-epoxy-2-methylpropyloxy)tetrahydropyran-2-carboxylate;
n-Octyl 6(2,3-epoxy-2-methylpropyloxy)tetrahydropyran-2-carboxylate;
2-ethylhexyl 6-(2,3-epoxy-2-methylpropyloxy)tetrahydropyran-2-carboxylate;
Hexadecyl 6-(2,3-epoxy-2-methylpropyloxy)tetrahydropyran-2-carboxylate;
Allyl 6(2,3-epoxy-2-methylpropyloxy)tetrahydropyran-2-carboxylate;
Crotyl (6-(2,3-epoxy-2-methylpropyloxy)tetrahydropyran-2-carboxylate;
Decyl 6-(2,3-epoxy-2-methylpropyloxy)tetrahydropyran-2-carboxylate;
Tridecyl 6-(2,3-epoxy-2-methylpropyloxy)tetrahydropyran-2-carboxylate;
Ethyl 6-(2,3-epoxybutyloxy)tetrahydropyran-2-carboxylate;
Butyl 6-(2,3-epoxybutyloxy)tetrahydropyran-2-carboxylate;
n-Octyl 6-(2,3-epoxybutyloxy)tetrahydropyran-2-carboxylate;
2-ethylhexyl 6-(2,3-epoxybutyloxy)tetrahydropyran-2-carboxylate;
Hexadecyl 6-(2,3-epoxybutyloxy)tetrahydropyran-2-carboxylate;
Allyl 6-(2,3-epoxybutyloxy)tetrahydropyran-2-carboxylate;
Crotyl 6-(2,3-epoxybutyloxy)tetrahydropyran-2-carboxylate;
Decyl 6-(2,3-epoxybutyloxy)tetrahydropyran-2-carboxylate;
Tridecyl 6-(2,3-epoxybutyloxy)tetrahydropyran-2-carboxylate;
Ethyl 6-(2,3-epoxy-1,3-dimethylpropyloxy)tetrahydropyran-2-carboxylate;
Butyl 6-(2,3-epoxy-1,3-dimethylpropyloxy)tetrahydropyran-2-carboxylate;
n-Octyl 6-(2,3-epoxy-1,3-dimethylpropyloxy)tetrahydropyran-2-carboxylate;
2-ethylhexyl 6-(2,3-epoxy-1,3-dimethylpropyloxy)tetrahydropyran-2-carboxylate;
Hexadecyl 6-(2,3-epoxy-1,3-dimethylpropyloxy)tetrahydropyran-2-carboxylate;
Allyl 6-(2,3-epoxy-1,3-dimethylpropyloxy)tetrahydropyran-2-carboxylate;
Crotyl 6-(2,3-epoxy-1,3-dimethylpropyloxy)tetrahydropyran-2-carboxylate;
Decyl 6-(2,3-epoxy-1,3-dimethylpropyloxy)tetrahydropyran-2-carboxylate;
Tridecyl 6-(2,3-epoxy-1,3-dimethylpropyloxy)tetrahydropyran-2-carboxylate.

The analysis for the epoxy group content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of phenolphthalein indicator (1.0 gram per 100 milliliters of 60 percent ethanol) added, and the mixture titrated to a permanent red endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The analysis for determining epoxidant, that is, peracetic acid, content can be performed, for example, by introducing one to 1.5 grams of a sample of unknown epoxidant concentration into a flask containing a mixture of 60 milliliters of 50 weight percent aqueous sulfuric acid solution and five milliliters of a saturated potassium iodide solution. The flask is swirled to mix the solutions and then titrated immediately with a 0.1 N aqueous sodium thiosulfate solution to a colorless endpoint. From the titration data thus obtained, a determination of epoxidant content can be made.

In order to determine the acetic acid content of the reaction mixtures in the examples, the following procedure can be used, for example, another sample of approximately the same size can be taken at the same time and introduced into a flask containing about 100 milliliters of water and about 15 milliliters of acetaldehyde. The flask and contents are allowed to stand for ten to fifteen minutes after mixing so as to permit whatever peracetic acid is present in the sample to be converted to acetic acid. The acetic acid of the solution is then titrated with a 0.5 N sodium hydroxide solution using a phenolphthalein indicator. The amount of acetic acid originally present in the sample then can be taken to be equal to the final acetic acid content after conversion, as determined by titration with sodium hydroxide, minus the amount of acetic acid formed by the reaction of peracetic acid with acetaldehyde originally present in the sample. The amount of acetic acid formed by reaction of peracetic acid with acetaldehyde may be calculated from the previous sodium thiosulfate titration determination of epoxidizing agent content on the basis of two mols of acetic acid being formed from each mol of peracetic acid.

The following examples will serve to illustrate the practice of the invention:

EXAMPLE 1

*Allyl 6-allyloxytetrahydropyran-2-carboxylate*

A mixture of 768 grams (6.0 mols) of 7-oxo-6,8-dioxabicyclo [3.2.1] octane, 1740 grams (30.0 mols) of allyl alcohol, 400 milliliters of diisopropyl ether, 12.5 grams of copper sulfate, and 12.5 grams of concentrated sulfuric acid was charged to the kettle of a still. The solution was heated to reflux and the water was removed as rapidly as possible. When the water formation ceased, the solution was allowed to stand at room temperature for 16 hours. The sulfuric acid was neutralized with 75 grams of sodium acetate, and the mixture was distilled to recover 1096 grams (80.8 percent yield) of allyl 6-allyloxytetrahydropyran-2-carboxylate. The product distilled at 100–107° C./0.8–1.0 mm. Hg absolute; $n_D^{20}$, 1.4649; specific gravity 20° C./15.6° C., 1.059. Calculated for $C_{12}H_{14}O_4$: saponification equivalent, 226.3. Found: saponification equivalent, 223.2.

EXAMPLE 2

*Decyl 6-allyloxytetrahydropyran-2-carboxylate*

A charge consisting of 339 grams (1.5 mols) of allyl 6-allyloxytetrahydropyran-2-carboxylate, 711 grams (4.5 mols) of oxo decanols derived from the hydroformylation of a tripropylene fraction followed by hydrogenation of the decanal-decanol fraction from the hydroformylation, and 5.2 grams of sodium methoxide was made in the kettle of a still and allowed to stand overnight (16 hours). The mixture was distilled to recover 438 grams (89.5 percent yield) of decyl 6-allyloxytetrahydropyran-2-carboxylate; boiling point, 151–156° C./6–.07 mm. Hg absolute; $n_D^{20}$, 1.4599; specific gravity 20° C./15.6° C., 0.9735. Calculated for $C_{19}H_{34}O_4$: saponification equivalent, 326.5; molecular refraction, 92.2. Found: saponification equivalent, 321.2; molecular refraction, 91.8.

EXAMPLE 3

*Preparation of allyl 6-(2,3-epoxypropoxy)tetrahydropyran-2-carboxylate*

A charge of 226 grams (1.0 mol) of allyl 6-alloyloxy-tetrahydropyran-2-carboxylate was placed in a one-liter kettle equipped with a stirrer, a reflux condenser, an addition funnel, and a thermometer. The material was warmed to 50° C. and a solution of 95 grams (1.25 mols) of peracetic acid in 309 grams of ethyl acetate was added to the kettle over a period of six hours. The temperature was maintained between 50° C. and 65° C. by means of a hot water bath. The solution was allowed to stand overnight and then fed slowly to the kettle of a still containing 800 milliliters of boiling ethylbenzene under 20 mm. Hg pressure. After all low-boiling products were removed the residual material was distilled to provide 120 grams (49.5 percent yield) of allyl 6-(2,3-epoxypropoxy)tetrahydropyran-2-carboxylate which boiled at 112–117° C./1 mm. Hg pressure; $n_D^{20}$, 1.4673; specific gravity 20° C./15.6° C., 1.1165. Calculated for $C_{12}H_{18}O_5$: saponification equivalent, 242. Found: saponification equivalent, 239.

EXAMPLE 4

*Preparation of decyl 6-(2,3-epoxypropoxy)tetrahydropyran-2-carboxylate*

A charge consisting of 326 grams (0.1 mol) of decyl 6-allyloxytetrahydropyran-2-carboxylate was placed in a one-liter kettle equipped with a stirrer, a reflux condenser, an addition funnel, and a thermometer. The ester was warmed to 44° C. and a solution of 95 grams of peracetic acid in 309 grams of ethyl acetate was added to the kettle over a period of 1.5 hours while maintaining the mixture at a temperature of 60° C. by means of a hot water bath. The mixture was warmed at 60° C. for an additional five hours, then slowly added to the kettle of a still containing 500 milliliters of boiling ethylbenzene under 20 mm. Hg pressure. The mixture was distilled during the addition, and after all low boilers were removed, the residue was distilled to provide 163 grams (47.6 percent yield) of decyl 6-(2,3-epoxy-propoxy)tetrahydropyran-2-carboxylate. The product had the following physical properties: boiling point, 191–193° C./1 mm. Hg absolute, $n_D^{20}$, 1.4632; specific gravity 20° C./15.6° C., 1.002. Calculated for $C_{19}H_{34}O_5$: saponification equivalent, 342. Found: saponification equivalent, 329.

This compound is an effective plasticizer for resinous copolymers of vinyl chloride and vinyl acetate containing 97½ percent copolymerized vinyl chloride and 2½ percent of copolymerized vinyl acetate, in an amount of 50 percent based on the weight of the polymer. The following data illustrate favorably the comparison of the decyl 6-(2,3-epoxypropoxy)tetrahydropyran-2-carboxylate and a commercial plasticizer, dioctylphthalate, commonly used for plasticizing polyvinyl chloride resins:

|  | Plasticizer | |
| --- | --- | --- |
|  | Decyl 6-(2,3-epoxypropoxy)-tetra-hydropyran-2-carboxylate | Dioctyl Phthalate |
| Resin, parts | 100 | 100 |
| Plasticizer, parts | 50 | 50 |
| $T_4$, ° C | 9 | 7 |
| $T_B$, ° C | −6 | −26 |
| Percent Extraction: Oil, K, 24 hours at 50° C | 1.53 | 1.8 |
| Percent Extraction: Water, 24 hours at 70° C | 8.4 | 1.2 |
| SPI Volatile loss, percent | 8.6 | 2.8 |
| Durometer "A" hardness | 80 | 80 |

What is claimed is:

1. Compounds characterized by the general formula:

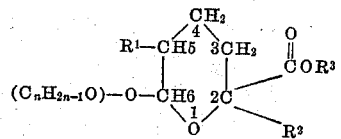

wherein $R^1$ and $R^2$ each represent members selected from the group consisting of hydrogen and lower alkyl radicals; $R^3$ represents a member selected from the group consisting of alkyl and alkenyl groups containing up to 20 carbon atoms and the group $(C_nH_{2n-1}O)$ represents a 2,3-epoxyalkyl group containing from 3 through 8 carbon atoms.

2. A chemical compound allyl 6-(2,3-epoxypropoxy)-tetrahydropyran-2-carboxylate.

3. A chemical compound, decyl 6-(2,3-epoxypropoxy)-tetrahydropyran-2-carboxylate.

No references cited.